Feb. 24, 1953     O. A. CARNAHAN     2,629,570
HELICOPTER-AIRPLANE
Filed Aug. 9, 1945     5 Sheets-Sheet 1
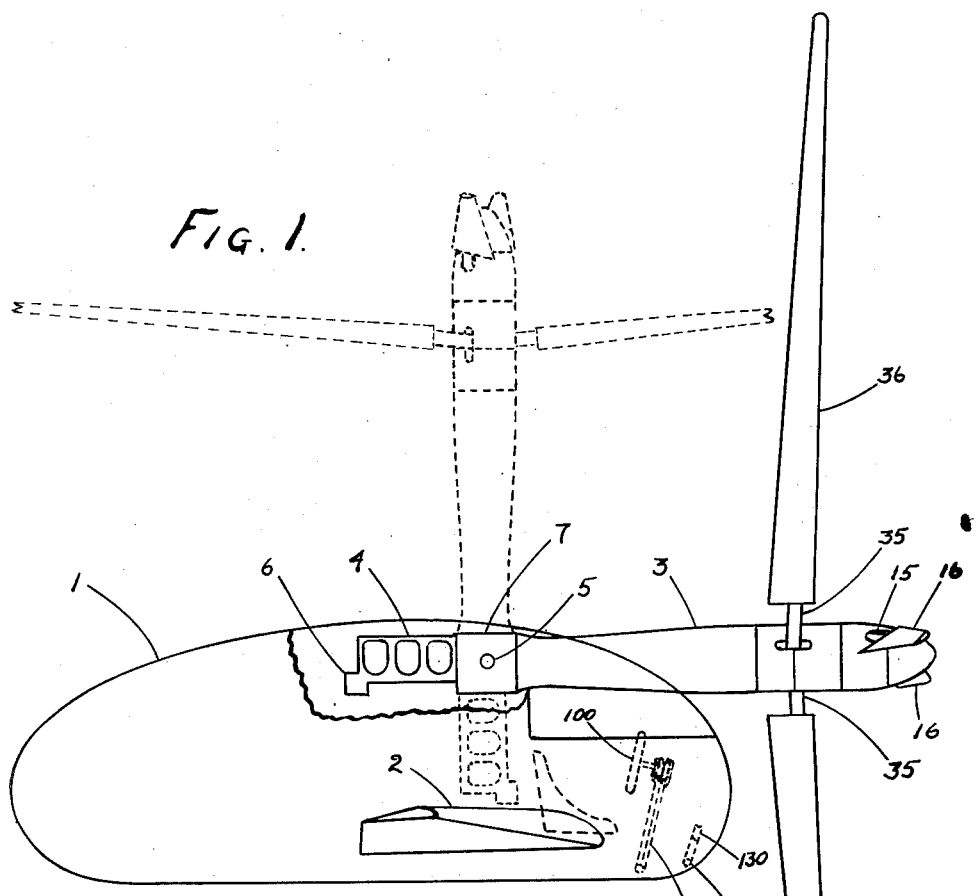
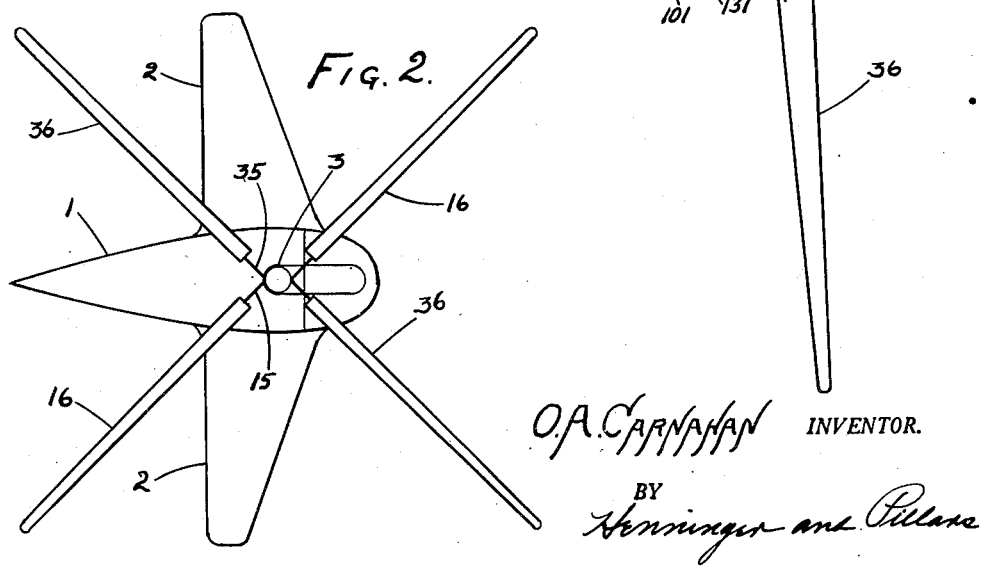
O. A. CARNAHAN INVENTOR.
BY Henninger and Pillans

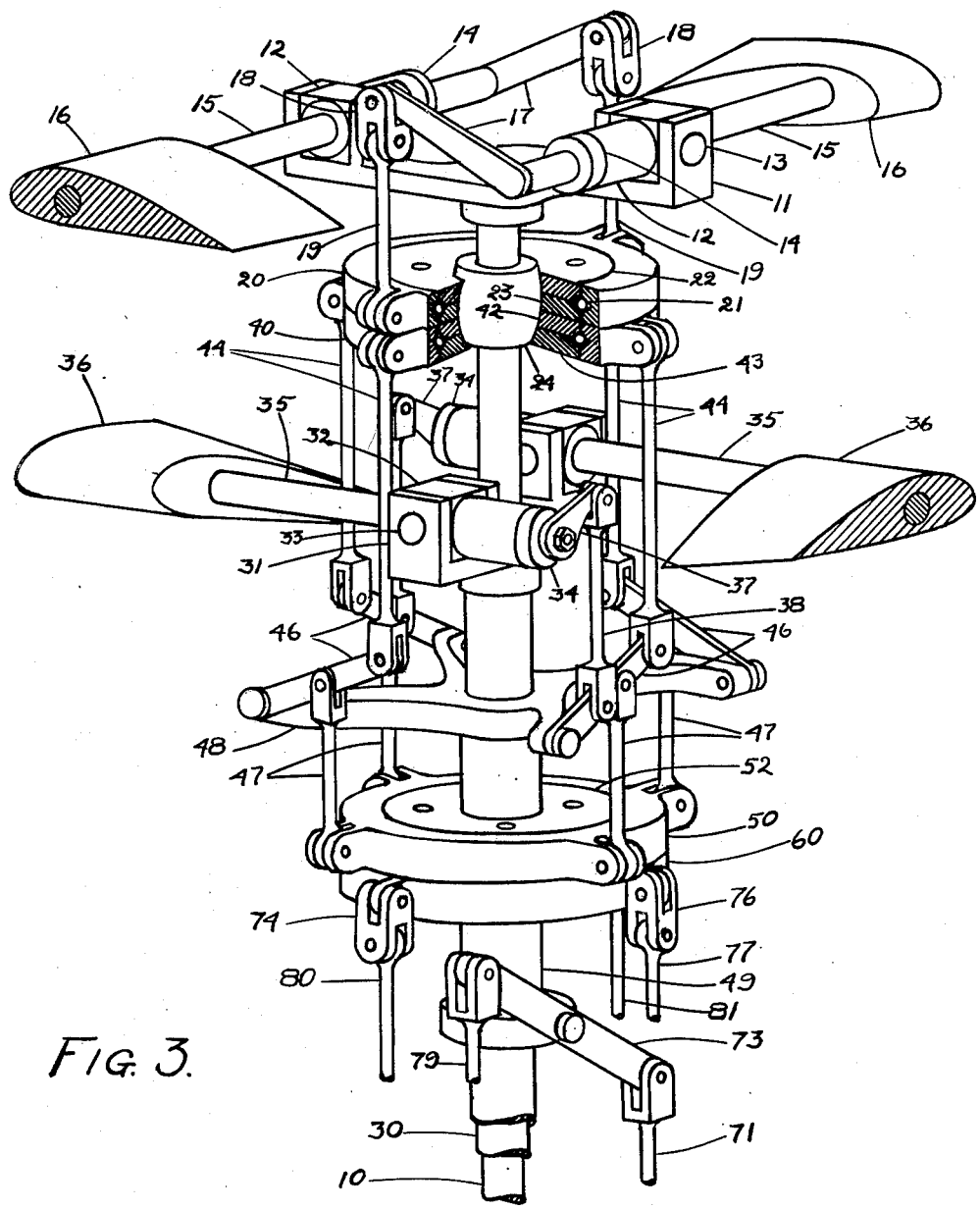

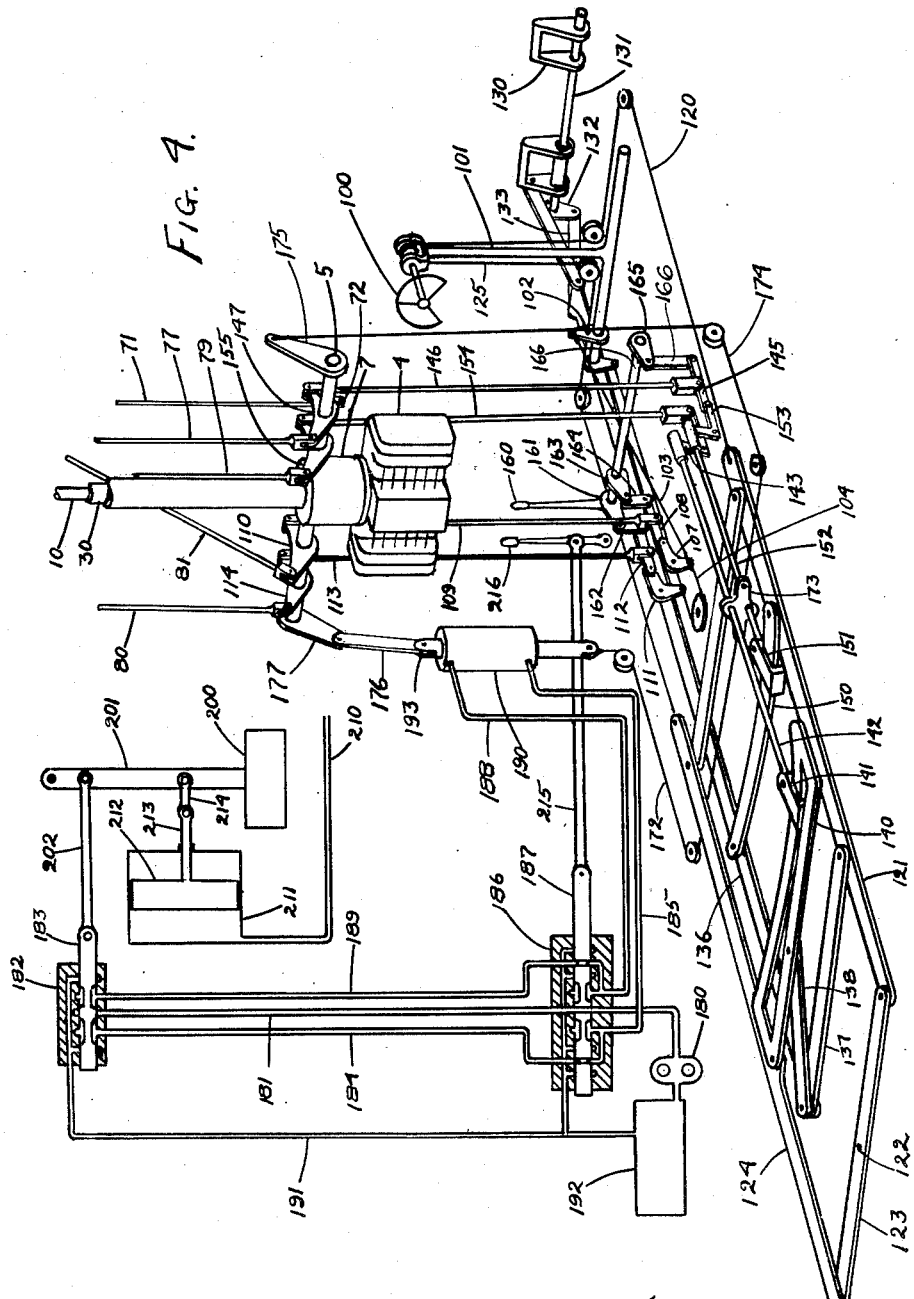

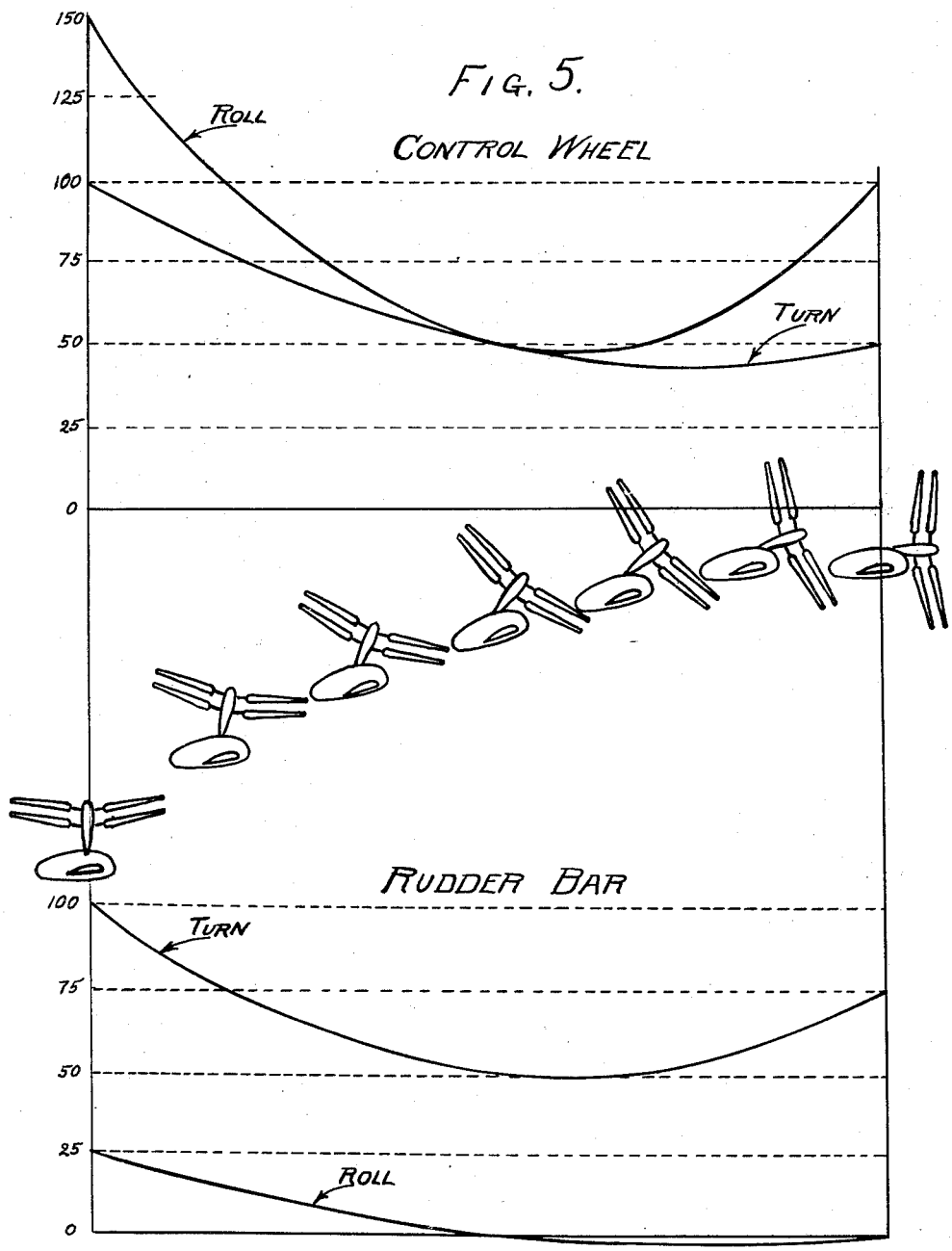

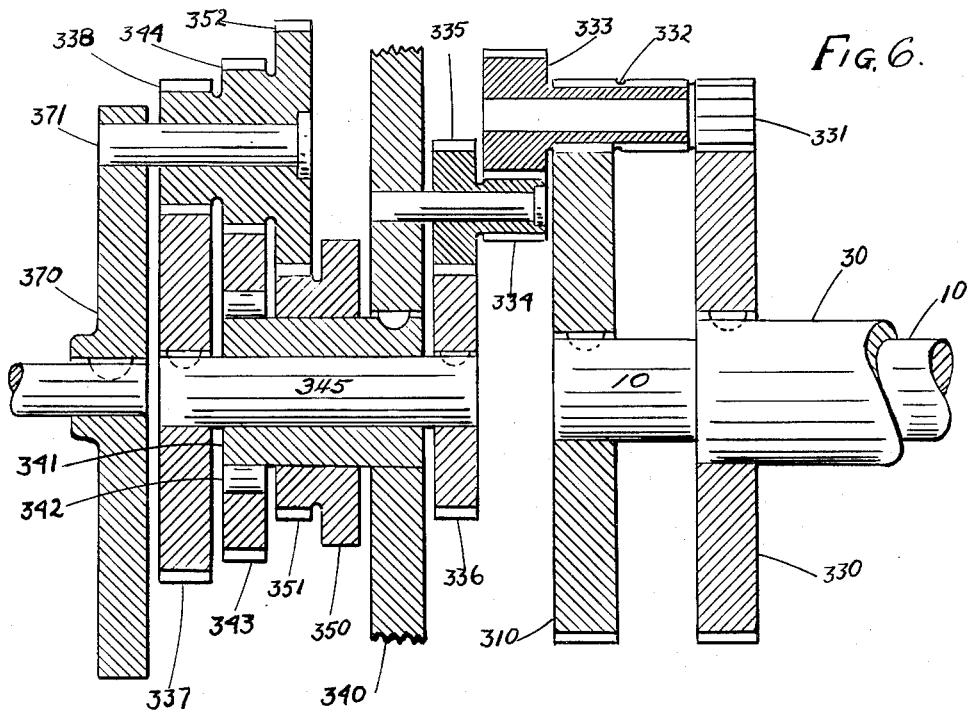
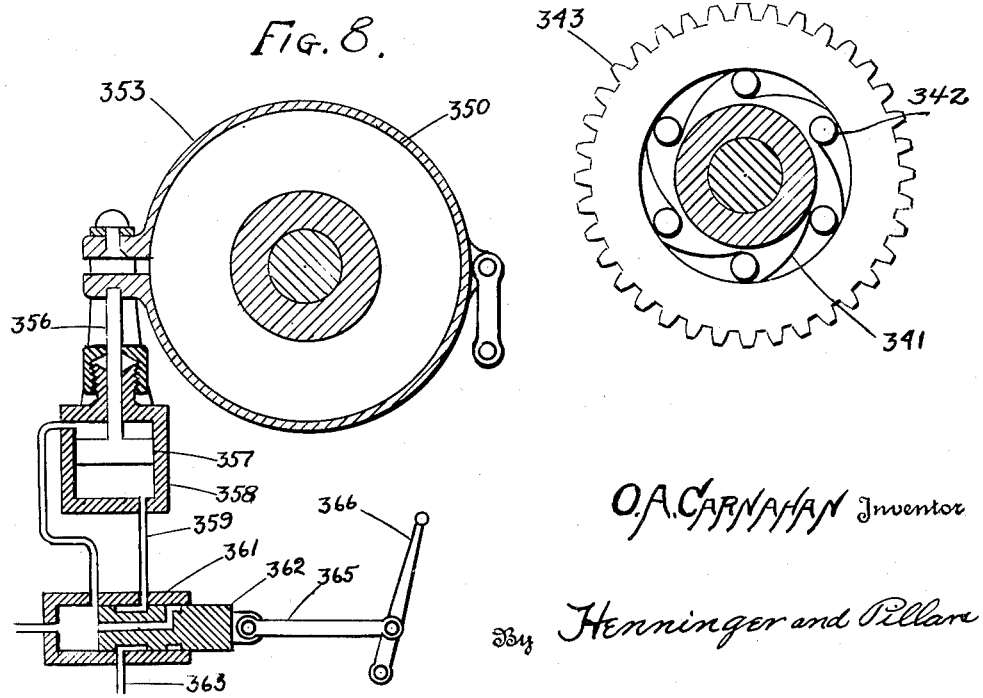

Patented Feb. 24, 1953

2,629,570

UNITED STATES PATENT OFFICE 2,629,570

HELICOPTER-AIRPLANE

Orson A. Carnahan, Syracuse, N. Y.

Application August 9, 1945, Serial No. 609,807

9 Claims. (Cl. 244—7)

This invention relates to heavier-than-air aircraft and more particularly to large, variable speed, variable pitch propellers and their application to a helicopter-airplane to combine the desirable characteristics of heavier-than-air aircraft.

In the past comparatively small diameter rigid blade counter rotating variable pitch propellers have been designed to give maximum efficiency at definite conditions of speed and thrust, and then operated at a reduced angle of attack to give added thrust for take-off, or climb. Also large diameter articulated blade rotors have been designed for autogiros and helicopters where exceptionally high values of thrust are required. Articulated blade coaxial counter rotating rotors have not been practical as there is a balance between centrifugal force and lift that causes the sides which move in the direction of flight to run high causing separation on one side and interference on the other. None of these designs, however, have had sufficient range to allow their use both as propellers and rotors. Therefore, it has not been practical to combine the operating characteristics of the airplane and helicopter to furnish a high speed machine with the landing characteristics of the helicopter.

An object of the invention is to provide large diameter, variable pitch, variable speed rotors that will operate first as high efficiency propellers with high air speed, low rotational speed, and low thrust, and second, will operate very satisfactorily at low air speed, high rotational speed, and high thrust.

Another object of this invention is to provide counter rotating articulated blade propellers having an automatic cyclic pitch controlled by the thrust and centrifugal force to prevent blade interference when flying as a helicopter at high speed.

A further object of the invention is to provide a helicopter-airplane, hereafter termed a heliplane, using these versatile propellers which can take-off vertically, fly, or turn in any direction as a helicopter, and then while flying forward as a helicopter, be transformer to give all the flight and control characteristics of a high speed, small wing airplane.

A further object of the invention is to provide a mechanism that will embody conventional airplane control for all conditions of flight from high speed airplane performance to helicopter operation for take-off, landing, or low speed maneuvering.

Still another object of this invention is to provide an efficient variable pitch warped blade propeller that will autorotate without power so that it may be landed safely even under adverse conditions.

Still another object of this invention is to provide an articulated blade propeller having blades off-set toward the leading edge so centrifugal force may be utilized to reduce spar bending due to torque.

A still further object of the invention is to provide a multiple ratio reduction gear in combination with the variable speed, variable pitch propeller to improve the flexibility and efficiency of operation.

With the foregoing and other apparent objects in view, the invention consists of certain novel features of construction, combination, and arrangement of parts hereinafter fully described, illustrated in the accompanying drawings, and specifically pointed out in the appended claims, it being understood that various changes of details of structure may be made without sacrificing any of the advantages or departing from the spirit of the invention.

In describing the invention in detail, reference will be had to the accompanying drawings wherein like characters denote like or corresponding parts throughout the several views, and in which:

Figure 1 is a side elevation showing the propeller axes in the position for high speed airplane operation and with the propeller axes shown dotted in a vertical position for helicopter operation;

Figure 2 is a plan view of the heliplane with the propeller axes in position for helicopter operation;

Figure 3 is the propeller assembly showing pitch control, blade articulation, and how blades are off-set to reduce spar stress;

Figure 4 is a diagrammatic sketch of the control mechanism;

Figure 5 shows the machine roll and turn response to movement of the wheel, or stick and to movement of the rudder bar, for all angles of propeller, or rotor, axes to fuselage;

Figure 6 is a diagrammatic illustration, partially in section and partially in elevation, of one embodiment of a multiple ratio reduction gear;

Figure 7 is a view partially in section and partially in elevation showing the over-running clutch associated with the transmission which permits auto-rotation as a helicopter when the engine is idle; and Figure 8 is a view partially in section and partially in elevation showing the brake band and control mechanism of the two-speed planetary gear.

In Figure 1, 1 is the fuselage, 2 is a fixed wing surface, 3 is the propeller assembly, 4 is the motor and 5 is a trunnion which allows the propeller transmission and motor assemblies to turn relative to the fuselage, 6 shows the position of the oil sump that permits operation with the motor axis either horizontal or vertical, and 7 is a transmission.

Briefly, the operation of the heliplane is as follows: With the propeller axes vertical as shown in Figure 2, or dotted in Figure 1, the motor speed and propeller pitch may be increased to take-off vertically after which the vertical motion may be controlled by increasing or decreasing the power or pitch, or both. The machine may be turned about its vertical axis by increasing or decreasing the pitch of one propeller relative to the other. It may also be flown in any horizontal direction by decreasing the relative lift of the side of the propeller toward which it is desired to move. This is accomplished by tilting the tilt ring in the direction it is desired to fly. The movement of tilt ring 20 acting through links 19, 18, crank 17, and spar 15, changes the cyclic pitch of the propeller blade 16. By changing the length of the crank or arm 17, the cyclic pitch of the propeller blade may be made to lead the tilt of the tilt ring sufficiently to offset the lag in the azimuth between the action of the cyclic pitch and its reaction to tilt the tip path plane. The same holds for tilt ring 50, links 47, 38, crank 37, and spar 35, to cause the lift of the blades 36 to follow the tilt of the tilt ring 50.

As the forward speed is increased, the wing surfaces 2 take part of the lift. By rotating the propeller axes forward relative to the wing, the wing lift can be increased and the forward speed increased until the machine is in the position shown in Figure 1, and the speed has increased to above the stalling speed of the wing. It will then fly efficiently due to the low lift drag ratios of the wings and propeller blades (the wings being at a high angle of attack due to the low flying speed and the propeller at a very low angle of attack due to the low thrust, high air speed, and large blade areas). By substantially reducing the propeller speed by increasing the engine propeller reduction ratio, the propeller air speed may be reduced. Since the propeller thrust varies approximately with the square of the air speed, the propeller can be operated at its best lift over drag ratio or at high efficiency. The propeller pitch may now be materially increased to increase the flying speed, so that the machine can be flown as a high speed airplane with a very high overall efficiency. When it is desired to land, the sequence of controls is reversed. In case of motor failure, the propeller speed will increase as the pitch is decreased, and the propellers will continue to rotate like the rotor of an autogiro, then the machine will descend at a moderate speed. As the landing is approached, the propeller pitch is increased to utilize the energy of rotation to check the rate of descent to make a safe landing without ground run.

More in detail, the arrangement, functioning, and control of the various elements of the heliplane is as follows: Figure 3 shows the counter-rotating propeller assembly with the blades nearly horizontal ready for take-off. In Figure 3, 11 is the upper, or front, propeller hub which is keyed to propeller shaft 10. A propeller blade hinge 12 is attached to the propeller hub 11 by the trunnion 13. The propeller blade 16 is mounted on the propeller blade spar 15 which passes through the propeller hinge 12, and is held in position by the thrust bearing 14. The pitch of this propeller can be changed by means of the cranks or arms 17, connecting links 18 and 19, and a tilt ring 20. The axes of the propeller blades are off-set toward their leading edge. The centrifugal force which is radial has a component which acts toward the leading edge to off-set part of the drag and reduce the stress in the blade spars 15. The center of lift of the propeller blades is substantially diametrically opposite the links 18 and 19 resulting in the propeller thrust being inclined to the propeller axis in the direction in which the axis of the tilt ring 20 has been moved. The tilt ring 20 rotates on the ball bearing 21 with the upper propeller. The inner races of the tilt ring 22, 23, 42, and 43, of tilt rings 20 and 40 are free to turn on the spherical hub 24. The spherical hub 24 is free to slide, or turn, on the upper propeller shaft 10. The tilt ring 40 is positioned by the connecting links 44. Links 46 and 47, serve to connect links 44 with the tilt ring 50. Tilt ring 50 is connected to the tilt ring 60 in the same manner that tilt ring 20 is connected to tilt ring 40. Tilt ring 60 can be moved axially, or tilted in any direction by means of the control links 74, 80, 76, 77, and 81. The lower or rear propeller blades 36 and blade spars 35 are attached to the outer propeller shaft 30 by means of hinge block 32, trunnion 33, thrust bearing 34, and propeller hub 31, in the same manner as was described for the upper propeller, or rotor. The pitch of the lower propeller, or rotor, is controlled by means of the cranks, or arms 37, the control links 38, 46, and 47, and tilt ring 50. Links 46 are also connected to the relative pitch control hub 48. This relative pitch control hub 48 is free to turn with the lower, or rear, propeller and may be moved axially by means of the hollow shaft 49, and links 73 and 79.

Figure 4 is a diagrammatic sketch of the control mechanism for the heliplane. This figure shows the propeller axis in the vertical position, and the control connections in the position for helicopter operation ready for take-off. The control of this mechanism is as follows: Forward motion of the pitch control lever 160, acts through links 161, 162, 112, 113, bell crank 114, and control links 80 and 74 (Figure 3) pulling down the back side of tilt ring 60. At the same time this forward motion acts through links 163, 164, 108, 109, bell crank 110, and control link 81, pulling down on the front side of tilt ring 60. This forward motion also acts through links 165, 166, 145, 146, bell crank 147, control links 77 and 76, pulling down on the right side of tilt ring 60. These motions pull the tilt ring assembly 50, 52, and 60 axially downward. This downward motion of tilt ring 50 acts through links 47, 46, 38, bell cranks 37, and wing spars 35 to increase the pitch of the lower propeller blades 36. At the same time this motion of tilt ring 50 acts through links 47, 46, and 44, pulling tilt ring assembly 40, 43, 42, 23, 22, and 20 downward. This downward motion of the tilt ring 20 acting through control links 19 and 18, cranks 17, and wing spars 15 increases the pitch of the upper propeller blades 16. This increase of pitch increases the lift of both propellers for vertical take-off. When flying as a helicopter, forward motion of the control wheel 100 acts through control column 101, crank 102, control cables 103, bell crank 107, links 108 and 109, bell crank 110, and link 81, to pull down the front side of tilt ring 60. At the same time this motion also acts through control cables 103, and 104, bell crank 111, control links 112 and 113, bell crank 114, links 80 and 74, to push up the back side of tilt ring 60. This forward motion of the wheel, therefore, results in a forward tilting of the tilt ring assemblies together with the pitch control linkages. This increases the lift of the propeller blades on the back side and decreases the lift of the propeller blades on the front side to cause the whole machine to tilt and move forward.

Coaxial articulated blade rotors have not heretofore been considered feasible on account of blade interference. As this machine moves forward, the sides of the rotors moving in the direction of flight have a higher airspeed than the opposite sides. As the lift increases with the airspeed, the blade 16 moves up and the end of the blade spar 15, which is attached to the pitch control crank 17, moves down relative to the control link 18. This results in a decrease of blade pitch to compensate for the higher airspeed. These rotors may, therefore, be placed relatively close together without blade interference.

As the machine tilts forward, a pendulum weight 200 swings forward and acting through the links 201 and 202, draws the valve 183 forward. This allows oil under pressure supplied by the pump 180 to flow through oil line 181, valve chest 182, oil line 184, through the manually controlled valve chest 186 and oil line 185 to the bottom of the cylinder 190, moving the piston upward. The low pressure oil returns through oil line 188, valve chest 186, oil line 189, valve chest 182, oil line 191, to the sump 192. The upward motion of the piston acts through piston rod 193, link 176, and crank 177, trunnion shaft 5, causing the fuselage to return to a level position. If the wheel is held in this forward position, the propeller axes continue to move forward and the speed continues to increase. The air speed acts on the Pitot tube 210 which, in turn, acts on the piston 212. This force acting through links 213 and 214 augments the pendulum action of the weight 200, thus raising the nose of the fuselage and wing structure to give a high angle of attack. The load has thus been transferred from the rotor to the fixed wing and the machine will be flying as an airplane at moderate speed with high angle of attack and relative high propeller speed.

While the load is being transferred from the rotor to the fixed wing by inclining the rotor, or propeller assembly, forward relative to the fuselage, the tilt ring assembly is drawn toward the trunnion axis 5 by the control links 77, 80, and 81 which are attached to bell cranks 147, 114, and 110, at points back and above the trunnion axis. This automatically increases the pitch of both propellers as is required by the increased forward speed. It will be noted that link 79 is attached to bell crank 155 at a point back and above the trunnion axis 5, while link 71 is attached to a fixed point 72 on the trunnion axis support in front of and below the trunnion axis. The linkage 79, 73, and 71 thus holds the center of link 73 and the differential pitch control sleeve 48 at a fixed distance from the trunnion axis making the differential mean pitch independent of the propeller axis assembly. If desired, the propeller axis may be moved forward relative to the fuselage by moving the manual control lever 216 forward. This motion acts through links 215 and valve 187 to cut off the flow of oil under pressure to the automatic control valve chest 182, and then admits oil from this oil pressure line 181 through valve chest 186 to oil line 185 to manually control the angle between the fuselage and the propeller axis.

When flying as a helicopter, turning the wheel 100 to the right pulls on control cable 125, and link 124, turning bar 123 about a fixed point 122, pulling 121 and right end of transverse shift control link 150 backward. This pulls shift control block 151, link 152, bell crank 153, links 145 and 146, bell crank 147, links 77 and 76, to tilt tilt ring assembly to the right. This rolls and moves the machine to right. Pulling on cable 125 and link 124 will also move the left end of shift control link 140 forward and the right end backward. This pulls shift control block 141 backward. This motion acting through link 142, bell crank 143, link 154, bell crank 155, links 79 and 73, pulls the control sleeve 49 and control hub 48 downward. This motion acting through links 46 and 38 increases the pitch of the lower propeller and also acting through links 46 and 44 and upper tilt ring assembly, links 19 and 18, and cranks 17 decreases the pitch of the upper propeller. This causes the torque on the lower propeller to be increased while the torque on the upper propeller is decreased. This unbalanced torque causes the machine to turn to the right. Therefore, when flying as a helicopter turning the wheel to the right causes the machine to both roll, fly and turn to the right. Also when flying as a helicopter, a force on the right rudder 130 acts through shaft 131 and crank 132, pushing links 133, 136, 137, and 138 backward. This pulls the right hand end of differential shift control link 140 backward. This motion acting through control block 141, link 142, bell crank 143, link 154, bell crank 155, links 79 and 73 causes the machine to turn to the right. This same backward motion of link 136 moves the left hand end of shift control link 150 backward thus giving a small movement to control block 151, control link 152, bell crank 153, links 145 and 146, bell crank 147, links 77 and 76, thus causing the machine to roll slightly to the right.

As described before, forward motion of the wheel causes the machine to tip forward, which in turn acting through the servo mechanism returns the fuselage to a horizontal position by turning the trunnion shaft 5 and propeller assembly relative to the fuselage. This motion of link 175 also acts through cable 174, shift control guide 173, to move shift control blocks 141 and 151 to the left end of links 140 and 150, when the machine will be flying as an airplane. When flying as an airplane, forward motion of the wheel 100 acts exactly the same as when flying as a helicopter to increase the pitch at the top of the propellers or rotors and decreases it at the bottom, which causes the heliplane to nose in a downwardly direction. It will be noted that forward motion of the wheel 100 acts through control column 101, crank 102, control cables 103, bell crank 107, links 108 and 109, bell crank 110 and link 81 to shift one side of tilt ring 60. Simultaneously, this motion also acts through control cables 103 and 104, bell crank 111, control links 112 and 113, bell crank 114, links 80 and 74 to shift the opposite side of tilt ring 60. When flying as an airplane, turning the wheel to the right acts through cables 125, link 124, to pull left end of shift control link 140 forward. This acts through shift control block 141, link 142, bell crank 143, link 154, bell crank 155, links 79 and 73, to push differential pitch control sleeve 49 and hub 48 forward, thus increasing the pitch of the front propeller and decreasing the pitch of the rear propeller. This increases the torque on the front propeller and causes the machine to roll to the right or in the direction of the rear propeller. This turning of the wheel also acts through cable 125, link 124, bar 123, and link 121 to pull the right end of shift control link 150 backward. This gives a slight backward motion to shift control block 151 which acts through link 152, bell crank 153, links 145 and 146, bell crank 147, links 77 and 76, which tilts tilt ring assembly to the right and increases the propeller pitch on the left and decreases it on the right. This causes the machine to turn to the right. Turning the wheel to the right, therefore, rolls and turns the machine to the right. Also when flying as an airplane, force on the right rudder 130 acts through shaft 131, crank 132, links 133 and 136, moving the left end of shift control link 150 backward. This acts through shift control block 151, link 152, bell crank 153, links 145 and 146, bell crank 147, links 77 and 76, to turn tilt ring assembly to the right, thus turning the heliplane to the right the same as in the conventional airplane. This machine may, therefore, be flown either as an airplane or a helicopter without the use of a rudder bar except when it is desired to land cross wind.

When flying the heliplane with the propeller axis at approximately 45° to the line of flight, the cranks 175 and 177, attached to the trunnion shaft 5, acting through link 176 and piston rod 193, cable 172, shift control blocks 173 and cable 174, positions shift control blocks 141 and 151, in the center of shift control links 140 and 150. In this position a right turn of the wheel 100 pulls on cable 125, links 124, 123, and 121, moving right end of shift control link 150 backward. Shift control block 151 moves backward acting through link 152, bell crank 153, links 145 and 146, bell crank 147, and links 77 and 76, to move tilt ring assemblies to the right, thus increasing the propeller pitch on the left and decreasing it on the right. Due to the angularity of the propeller shaft, this additional thrust on the left side turns and rolls the heliplane to the right. This same motion of the wheel 100 acting through control cable 125, link 124, moves left end of shift control link 140 forward, and right end backward. Since shift control block 141 is in the central position, no motion will be transmitted from shift control block 141 through link 142, bell crank 143, and link 154, bell crank 155, and links 79 and 73 to differential control sleeve 49. In this flying position, right rudder 130 acting through shaft 131, crank 132, links 133, 136, and 138 pushes the center of shift control link 140 backward. This backward motion of the shift control block 141 acts through link 142, bell crank 143, link 154, bell crank 155, links 79 and 73, to push shift control sleeve 49, and shift control hub 48 upward. This upward motion of shift control hub 48 acting through links 46 and 38, and cranks 37 decreases the pitch of the lower or rear propeller. This motion also acting through links 46 and 44, upper or front tilt ring assembly 40, 43, 42, 23, 22, and 20, links 19 and 18, and bell cranks 17, increases the pitch of the upper propeller to give a greater torque to the front or upper propeller causing a reaction which due to the angularity of the shaft tends to roll the ship to the right and turn it to the left. At the same time the forward motion of link 136 moves the left end of shift control link 150 forward. This forward motion acting through shift control block 151, link 152, bell crank 153, links 145, and 146, bell crank 147, links 77 and 76, tilts pitch control ring assemblies to the right, increases the propeller pitch on the left and decreases it on the right which tends to roll and turn the ship to the right. The effect of right rudder, therefore, is to turn the ship to the right only since the transverse and differential pitch changes neutralize one another. Thus, when flying under these conditions, this mechanism provides conventional airplane control.

The actual control of the heliplane in flight can be best understood by referring to Figure 5 in conjunction with the foregoing disclosure. The rotor with its axis vertical as shown in Figure 2 will be started with the transmission brake, Figure 8, released. The transmission brake 353 is then set by using shift lever 366 to reduce the engine propeller reduction ratio. With all other controls neutralized the engine is accelerated and the propeller pitch is increased by moving pitch control lever 160 forward to give the required lift for take-off. After take-off the rate of ascent or descent may be controlled by increasing or decreasing the power or pitch, or both. The heliplane may now be rolled and turned in the same manner as an ordinary airplane except that when the machine is rolled by the wheel, the roll will be accompanied by turning and flying in the direction of the roll. Backward motion of the control wheel will cause the nose to rise and the machine will fly backward. Forward motion of the wheel tilts and flies the machine forward. The forward tilting of the fuselage acting through the pendulum 200 and the servo mechanism raises the nose of the fuselage and wings to a horizontal position. Continued forward motion of the control column increases the flying speed and the increased airspeed acting on the Pitot tube 210 augments the action of the pendulum weight 200 on the servo mechanism to increase the angle of attack. This forward motion of the control wheel, therefore, causes the machine to fly as shown in Figure 5 and the lift to be transferred from the rotor to the wings 2. During this maneuver, however, the bank and turn controls have remained the same as for the conventional airplane. When flying forward as shown in Figure 1, movement of the shift control 366 releases the brake and increases the engine propeller reduction ratio and forward motion of the pitch control lever 160 increases the pitch of the propellers. The machine will then fly and control the same as a conventional small wing high speed airplane. The heliplane may be landed by increasing the engine propeller ratio, decreasing the propeller pitch, and pulling back on the control wheel. The propeller speed will then increase, the airspeed will decrease, but instead of stalling like a conventional airplane the propeller axis will rise to the vertical position and the fuselage will assume a horizontal position. By reducing the power, the machine will descend. During this landing maneuver the machine does not temporarily go out of control as a conventional airplane in a stall, but may be controlled as a conventional airplane in normal flight. In case of emergency landing without power the propeller pitch is decreased to increase the rotational speed of the propeller and the control wheel pulled back to raise the propeller axis to the vertical position. The propeller will then autorotate at a high speed depending on the propeller pitch. The machine will now descend at a moderate speed. Just before landing the propeller pitch will be increased to utilize the momentum of the propeller to give added lift to check the rate of descent and give a safe landing without ground run.

Power from the motor is applied to the transmission (Figures 6, 7, and 8) through the planetary transmission hub 370 of Figure 6. In starting the motor, the brake 353 shown in Figure 8 is released which permits break drum 350 and gear 351 to rotate on 341. The frame 340 holds the inner portion 341, Figures 6 and 7, of the overriding clutch stationary, and the rollers 342 prevent gear 343 from turning backward. The power is then transmitted through gears 343, 344, 338, and 337, through shaft 345 to the gear 336 of the reduction and reverse gear portion of the transmission. Gear 336 acts through the reduction gears 335, 334, 333, 332, and 310 to drive the upper propeller shaft 10 at reduced speed while 332 also acts through 331 and 330 to drive the lower propeller shaft 30 in the reverse direction. By moving control lever 366 back to the position shown in Figure 8, oil under pressure from 363 flows through 362, valve chest 361, flexible tube 359, to cylinder 358. This pressure acts through piston 357, piston rod 356, to engage brake band 353 and brake drum 350. This prevents gear 351 from turning backward. Power is then transmitted through gears 351, 352, 338, 337 through shaft 345 to gear 336, and the reduction gears to drive the propellers at speed suitable for take-off and helicopter operation. After the machine is flying as an airplane at moderate speed and relatively high propeller speed, the clutch is disengaged by movement of control lever 366 toward valve chest 361 which relieves the brake 353 and allows the propeller to operate at reduced speed and increased torque. Forward motion of pitch control lever 160 increases the pitch and forward speed to give efficient high speed airplane operation.

The term "heliplane" as used herein refers to an aircraft which can take-off vertically, fly and turn in any direction as a helicopter, and while flying in a forward direction as a helicopter can be transformed to fly in a conventional manner as an airplane.

It should be understood that the invention claimed is not limited to the exact details of design and construction shown and described herein, for obvious modifications will occur to a person skilled in the art.

What I claim as new and desire to secure by Letters Patent of the United States is the following:

1. An aircraft comprising a fixed wing and a fuselage, concentrically positioned propeller shafts supported by trunnions extending transverse to the fore and aft plane of the fuselage, bearing surfaces supported by said fuselage on which said trunnions are supported and are movable to permit rotation of the propeller shafts through substantially 90° between a generally vertical position and a forwardly extending generally horizontal direction, a pair of rotors each provided with a plurality of blades, one of said rotors being mounted on each of said shafts adjacent to the upper end thereof, propulsion means connected to said shafts adjacent to the opposite ends thereof to rotate said rotors in opposite directions, means for adjusting the cyclic pitch of the blades of said rotors, a pendulum supported by said fuselage and mounted for fore and aft movement with respect to said fuselage, and servo means operatively interconnecting said pendulum, fuselage, and propeller shafts, and responsive to relative movement between said pendulum and said fuselage for controlling the angle between said propeller shafts and said fuselage.

2. An aircraft comprising a fixed wing and a fuselage, concentrically positioned propeller shafts supported by trunnions extending transverse to the fore and aft plane of the fuselage, bearing surfaces supported by said fuselage on which said trunnions are supported and are movable to permit rotation of the propeller shafts through substantially 90° between a generally vertical position and a forwardly extending generally horizontal direction, a pair of rotors each provided with a plurality of blades, one of said rotors being mounted on each of said shafts adjacent to the upper end thereof, propulsion means connected to said shafts adjacent to the opposite ends thereof to rotate said rotors in opposite directions, means for adjusting the cyclic pitch of the blade of said rotors, servo means positioned between said propeller shafts and said fuselage for controlling the angle therebetween, and manually actuated means for controlling the action of the servo means.

3. An aircraft comprising a fixed wing and a fuselage, concentrically positioned propeller shafts supported by trunnions extending transverse to the fore and aft plane of the fuselage, bearing surfaces supported by said fuselage on which said trunnions are supported and are movable to permit rotation of the propeller shafts through substantially 90° between the generally vertical position and a forwardly extending generally horizontal direction, a pair of rotors each provided with a plurality of blades, one of said rotors being mounted on each of said shafts adjacent to the upper end thereof, propulsion means connected to said shafts adjacent to the opposite ends thereof to rotate said rotors in opposite directions, means for adjusting the cyclic pitch of the blades of said rotors, a pendulum supported by said fuselage and mounted for fore and aft movement with respect to said fuselage, and servo means operatively interconnecting said pendulum, fuselage, and propeller shafts, and responsive to relative movement between said pendulum and said fuselage for controlling the angle between said propeller shafts and said fuselage during flight of said heliplane, and manually actuated means for controlling the operation of said servo means independently of said pendulum.

4. An aircraft comprising a fixed wing and a fuselage, concentrically positioned propeller shafts supported by trunnions extending transverse to the fore and aft plane of the fuselage, bearing surfaces supported by said fuselage on which said trunnions are supported and are movable to permit rotation of the propeller shafts through substantially 90° between a generally vertical position and a forwardly extending generally horizontal direction, a pair of rotors each provided with a plurality of blades, one of said rotors being mounted on each of said shafts adjacent to the upper end thereof, a plurality of movable tilt rings positioned around said shafts which are connected to said rotors, propulsion means connected to said shafts adjacent to the opposite ends thereof to rotate said rotors in opposite directions, means for adjusting the cyclic pitch of the blades of said rotors by actuation of said tilt rings, servo means connected between said fuselage and propeller shaft for controlling the angle between said propeller shafts and said fuselage, a Pitot tube supported in the fore and aft plane of the fuselage to be affected by the air stream resulting from the forward motion of said aircraft, and means for controlling the servo means by the air pressure from the Pitot tube.

5. An aircraft comprising a fixed wing and a fuselage, concentrically propeller shafts supported by trunnions extending transverse to the fore and aft plane of the fuselage, bearing surfaces supported by said fuselage on which said trunnions are supported and are movable to permit rotation of the propeller shaft through substantially 90° between a generally vertical position and a forwardly extending generally horizontal direction, a pair of rotors each provided with a plurality of blades, one of said rotors being mounted on each of said shafts adjacent to the upper end thereof, propulsion means connected to said shafts adjacent to the opposite ends thereof to rotate said rotors in opposite directions, means for adjusting the cyclic pitch of the blades of said rotors, a pendulum supported by said fuselage and mounted for fore and aft movement with respect to said fuselage, servo means operatively interconnecting said pendulum, fuselage, and propeller shafts, and responsive to relative movement between said pendulum and said fuselage for controlling the angle between said propeller shafts and said fuselage, a Pitot tube supported in the fore and aft plane of the fuselage to be affected by the air stream, and means for modifying the action of the pendulum controlled servo means by the air pressure from the Pitot tube.

6. An aircraft comprising a fixed wing and a fuselage, concentrically positioned propeller shafts supported by trunnions extending transversely of the fore and aft vertical plane of the fuselage, bearing surfaces supported by said fuselage on which said trunnions are rotatable supported and are movable to permit rotation of the propeller shafts through substantially 90° between a generally vertical position and a forwardly extending generally horizontal direction, a pair of rotors each provided with a plurality of blades, one of said rotors being mounted on each of said shafts adjacent to the outer end thereof, propulsion means connected to said shafts adjacent to the opposite ends thereof to rotate said rotors in opposite directions, means connected to the blades of said rotors for adjusting the differential mean pitch of said rotors to provide a torque acting about the axes of the rotors, manual means, means connecting said adjusting means and said manual means and arranged to actuate said adjusting means in response to displacement of said manual means, means for shifting said connecting means between two terminal positions during the aforesaid rotation through substantially 90° of said propeller shafts with respect to said fuselage, said connecting means when in one terminal position being arranged to actuate said adjusting means in one sense in response to a displacement of said manual means in a given direction, and when in the other terminal position being arranged to actuate said adjusting means in the opposite sense in response to a displacement of said manual means in said given direction.

7. An aircraft comprising a fixed wing and a fuselage, concentrically positioned propeller shafts supported by trunnions extending transversely of the fore and aft plane of the fuselage, bearing surfaces supported by said fuselage on which said trunnions are supported and are movable to permit rotation of the propeller shafts through substantially 90° between a generally vertical position and a forwardly extending generally horizontal position, a pair of rotors each provided with a plurality of blades, one of said rotors being mounted on each of said shafts adjacent to the upper end thereof, a plurality of movable tilt rings positioned around said shafts which are connected to said rotors, an engine for rotating said rotors in opposite directions, a transmission provided with an overrunning clutch connected between said engine and said shafts, and means for adjusting the cyclic pitch of the blades of said rotors by actuation of said tilt rings.

8. An aircraft comprising a fixed wing and a fuselage, concentrically positioned propeller shafts supported by trunnions extending transversely to the fore and aft vertical plane of the fuselage, bearing surfaces supported by said fuselage on which said trunnions are supported and are movable to permit rotation of the propeller shafts through substantially 90° between a generally vertical position and a forwardly generally horizontally extending direction, a pair of rotors each provided with a plurality of blades, one of said rotors being mounted on each of said shafts adjacent to the upper end thereof, a source of power for rotating said rotors in opposite directions, means for controlling the movement of said shafts from a generally vertical to a generally horizontal position, means operative during the movement of said shafts to simultaneously and automatically vary the pitch of the blades of said rotors in the same sense, and manually controlled means operative for all angular positions of the propeller shafts to vary the pitch of said rotors with respect to each other.

9. An aircraft comprising a fixed wing and a fuselage, concentrically positioned propeller shafts supported by trunnions extending transversely of the fore and aft vertical plane of the fuselage, bearing surfaces supported by said fuselage on which said trunnions are rotatably supported and are movable to permit rotation of the propeller shafts through substantially 90° with respect to said fuselage between a generally vertical position and a forwardly extending generally horizontal direction, a pair of rotors each provided with a plurality of blades, one of said rotors being mounted on each of said shafts adjacent to the outer end thereof, propulsion means connected to said shafts adjacent to the opposite ends thereof to rotate said rotors in opposite directions, a linkage system connected to the blades of said rotors for adjusting the position thereof, a first adjusting means for operating said linkage system to adjust the differential mean pitch of said blades, a second adjusting means for operating said linkage system to adjust the cyclic pitch of said blades, a first manually operated means connected to said first and second adjusting means and arranged to actuate said first and second adjusting means in response to displacement of said first manually operated means, a second manually operated means connected to said first and second adjusting means and arranged to actuate said first and second adjusting means in response to displacement of said second manually operated means, shiftable means positioned between and connecting said first adjusting means and said linkage system positioned between and connecting said second adjusting means and said linkage system, means for moving said shiftable means between opposite extreme terminal positions during the aforesaid rotation through substantially 90° of said propeller shafts with respect to said fuselage whereby displacement of said first manually operated means and second manually operated means in a given direction when the shiftable means is in one terminal position serves to adjust said cyclic pitch and said differential means pitch in one sense, and when the shiftable means is in the opposite terminal position said displacement of said first manually operated means and second manually operated means in said given direction serves to adjust said cyclic pitch in said one sense and said differential mean pitch in the opposite sense.

ORSON A. CARNAHAN.

REFERENCES CITED

The following references are of record in the file of this patent:

UNITED STATES PATENTS

| Number | Name | Date |
|---|---|---|
| 1,524,309 | Perry | Jan. 27, 1925 |
| 1,622,191 | Filippi | Mar. 22, 1927 |
| 1,775,861 | Lehberger | Sept. 16, 1930 |
| 2,197,677 | Bennett | Apr. 16, 1940 |
| 2,230,370 | Baynes | Feb. 4, 1941 |
| 2,382,460 | Young | Aug. 14, 1945 |
| 2,387,762 | Leonard | Oct. 30, 1945 |